Nov 1, 1949.  F. G. HODELL  2,486,561
BUCKLE FOR EMERGENCY TIRE CHAINS
Filed June 19, 1946
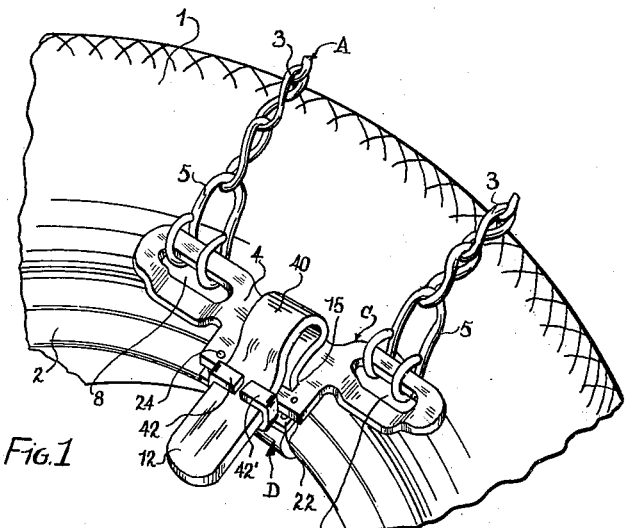
INVENTOR.
FREDERICK G. HODELL
BY
Kwis, Hudson, Baughton & Williams
ATTORNEYS Patented Nov. 1, 1949

2,486,561

UNITED STATES PATENT OFFICE 2,486,561

BUCKLE FOR EMERGENCY TIRE CHAINS

Frederick G. Hodell, Gates Mills, Ohio, assignor, by mesne assignments, to The National Screw and Manufacturing Company, Cleveland, Ohio, a corporation of Ohio Application June 19, 1946, Serial No. 677,812

5 Claims. (Cl. 24—194)

This invention relates to emergency antiskid chains, and more particularly to emergency antiskid chains having an improved buckle structure for removably securing such chains on the wheels of automotive vehicles.

Heretofore considerable difficulty has been experienced in securing and retaining emergency antiskid chains on the wheels of automotive vehicles. As is well known, the stresses and strains imposed on an emergency antiskid chain can be quite severe and unless a very secure locking action between the buckle member and the strap tie member is obtained, slippage and loosening of the chain on the wheel will inevitably result.

In the past it has been common practice to utilize buckles with hinged arms adapted to pivot to a locking position and squeeze or pinch the strap between a portion of the arm and the base plate of the buckle. Such a type of buckle for proper operation has rigid requirements on all its dimensions as well as on the thickness of the strap member utilized. For example, if the strap member is too thick, the hinged arm cannot be pivoted into locked position. If the strap member is too thin, then sufficient pressure does not result between the hinged arm and the base plate to give the securing action required in emergency antiskid chains. Furthermore, even though all dimensions be exactly correct when shipped from the factory, subsequent swelling of the strap due to the presence of oil or water or thinning due to wear will give the same result as though the strap were initially improperly sized. Either way an inferior locking action results, to the ultimate dissatisfaction of the user. One possible solution to the swelling problem has been the use of strap tie members impregnated with a substance impervious to both water and oil. However, such straps unduly increase the manufacturing cost of the emergency antiskid chain, while still not eliminating the difficulty of thinning from wear. Furthermore, the hinged arm type buckles are extremely difficult for the average layman to manipulate. Grime and ice, ever present at the time when emergency antiskid chains are called into use, even further accentuate the difficulty of manipulation.

It is an object of the present invention to provide a new and improved buckle for an emergency tire chain for automotive vehicle wheels such that the chain may be easily and simply installed, will not become loosened from the tire under even the most stringent types of service, and can be readily removed at will by even the most inexperienced operator.

Another object of the present invention is the provision of a new and improved buckle structure for an emergency tire chain which avoids the mechanical difficulties of the pivoted clamping type, which has a tension operated gripping action, and which utilizes the resilience of the strap for providing a more secure and continuous locking action on the strap.

A further object of this invention is the provision of a new and improved buckle for an emergency tire chain for automotive vehicles, which chain comprises antiskid elements and a heavy resilient strap member adapted to be removably secured by the buckle member, the buckle member having tension operated means for securing the strap and other means utilizing the resilience of the strap member for producing an initial locking action independent of the tension means and holding the tension operated means in operative position.

Another object of this invention is the provision of a new and improved buckle member for emergency tire chains and the like, comprising a base plate having a pair of openings adapted to receive a strap member, a tension operated locking member associated with one of said openings for locking the strap under tension, the other of said openings being offset from and facing angularly to said first mentioned opening whereby a resilient strap member positioned in said openings has an intermediate reverse bend holding the strap in engagement with the tension operated locking member and the edges of the openings.

Still another object of this invention is the provision of a new and improved buckle for an emergency tire chain for vehicle wheels and the like, which chain comprises antiskid elements and a resilient strap member, the said buckle member having a strap receiving opening, a locking member slidably mounted on the buckle member and also having a strap receiving opening cooperating with the buckle opening to lock the strap member when positioned in the openings, said buckle member having a second opening adjacent to but facing angularly relative to the first opening whereby the strap is held in frictional engagement with the edges of the openings regardless of the tension on the strap by a reverse flexure intermediate the buckle openings.

Still another object of this invention is the provision of a new and improved buckle for emergency tire chains and the like, comprising a plate having a strap receiving opening and a locking member slidably mounted on one side of said plate and having an opening cooperating with said first mentioned opening and locking the strap therein, in combination with spaced portions integral with the plate extending from the opposite side of said plate from the locking member and forming a second strap receiving opening adjacent to but offset from said first opening whereby a resilient strap member passing through said first mentioned openings must be reversely doubled back upon itself to pass through the second opening, the resilience of the strap at the reversed portion holding the strap in continuous engagement with the edges of said openings and the locking member in operative position.

A more specific object of this invention is the provision of a new and improved buckle structure comprising a plate having a rectangular strap receiving opening with side walls forming squared edges with the sides of the plate, in combination with a locking member slidably mounted on said plate having a rectangular strap receiving opening narrower in width than said first mentioned opening and capable of being axially aligned therewith whereby tension on a flexible member positioned in the aligned openings slides the locking member relative to the plate and locks the flexible member in the openings, said plate having a second strap receiving opening adjacent to and offset from the first opening with the side walls substantially parallel to the plane of the plate whereby the resilient strap positioned in said openings has an intermediate reverse bend holding the strap in continuous locking engagement with said edges and the locking member in operative position.

Other and more specific objects of this invention will appear upon a reading and understanding of this specification when taken in conjunction with the accompanying drawing which is a part thereof, wherein:

Fig. 1 shows a fragmentary perspective view of a vehicle tire with an emergency antiskid chain embodying the present invention mounted thereon;

Fig. 2 is a plan view of the emergency antiskid chain shown in Fig. 1, showing the parts in greater detail;

Fig. 3 is an enlarged side view of the buckle member;

Fig. 4 is a front view; and

Fig. 5 is a sectional perspective view showing the relationship of the tied member to the various parts of the buckle.

Referring to the drawing, Fig. 1 shows a fragmentary perspective view of a conventional automobile wheel including a tire 1 and a rim 2 having mounted thereon an emergency tire chain embodying the present invention. In general the emergency tire chain shown comprises a pair of antiskid elements or chains A, the opposite ends of which are connected to a spreader B and a buckle C, and a heavy flexible strap member D extending around the wheel, one end of which strap is permanently attached to the spreader B and the other detachably secured to the buckle C.

The antiskid chains or elements A may be of any commercial construction. As shown, they are formed of pieces of case-hardened steel chain 3 of a length sufficient to at least cover the outer tread of the tire 1. The chains are fastened at the ends to the spreader B and a base 4 of the buckle C by special U-shaped links 5 the ends of which pass through spaced transverse openings 6, 7 in the spreader B and openings 8, 9 in the base 4 and are then doubled back into engagement with the body of the link providing a permanent connection. The openings 6, 7 and 8, 9 may be separated any suitable distance to space the chains as desired.

As shown, the spreader B is formed of a heavy sheet metal plate 10 and has an elongated transverse rectangular opening 11 preferably positioned midway between the spaced openings 6, 7 but on the opposite edge of the plate. One end 12 of the strap member D passes through the opening 11, is doubled back upon itself, and is then fastened to the body of the strap by rivets 13.

The strap member D is preferably made of a heavy woven material and should preferably have a slightly roughened surface, as well as a high degree of resiliency. It will, of course, be appreciated that any material having the strength sufficient to withstand the stresses involved in fastening emergency tire chains to the wheels of automobiles can be used. As shown, the strap has an elongated rectangular cross section although other shapes could also be utilized.

The base 4 of the buckle C is formed of a heavy sheet metal plate stamped or otherwise cut to a suitable shape. Midway between the opening 8, 9 and offset therefrom, the base 4 has a transverse elongated rectangular strap receiving slot or opening 15 the side walls of which are substantially perpendicular to the sides of the plate and form therewith squared edges 17, 18, 19, 20. The length of the opening 15 is preferably somewhat greater than the width of the strap D, and the width may vary in accordance with the thickness of the base 4 and the thickness of the strap contemplated on being used. Preferably, and as shown, the width is such that the strap may be canted diagonally across the opening at an angle of approximately 45° with the sides of the base 4.

In the embodiment shown, a locking member 22 in the form of a rectangular plate is held in slidable relationship against the inner side of the base 4 by a pair of rivets 24, 25 fastened to the base adjacent the ends of the opening 15 and extending into spaced parallel slots 26 and 27 in the locking member 22. The locking member 22 has a transverse opening or slot 31 preferably rectangular in shape forming squared edges 33, 34, 35, 36 with the sides of the member, of a length somewhat greater than the width of the strap D, and of a width determined by the thickness of the locking member 22 and the thickness of the strap. Preferably, and as shown, the width of the opening 31 is such as to allow the strap to be canted to approximately an angle of 45° in the same manner as when positioned in the opening 15. As shown, the thickness of the locking member 22 is somewhat less than the base 4 and, accordingly, the width of the slot 31 is somewhat narrower than the width of the slot 15. In one position of the locking member 22, the opening 31 is at least partially aligned with the opening 15. The strap member D may then be inserted through the openings and locked therein by movement of the locking member 22 under the action of tension on the strap member.

The strap member D when under tension approaches the buckle C in a plane approximately parallel to the plane of the base 4 and the plane of sliding action of the member 22, and flexes or bends outwardly to pass through the openings 31 and 15. The flexing of the strap produces a pressure by the strap on the sharp edges 34, 35 of the opening 31, and the tension on the strap slides the locking member 22 in the direction of the tension, bringing the edge 34 against the strap and forcing it proportionately to the tension against the edge 18. As shown, the edges 18 and 34 substantially oppose each other and are in essentially the same plane. A shearing or pinching action results on the strap, producing a very high degree of locking action which is almost directly proportional to the amount of tension on the strap. This locking action is automatic and unidirectional. The strap moves easily through the openings when it is desired to tighten it by tension on the free end. As soon as the tightening force or tension is released, the locking action immediately takes effect, preventing slippage and obviating the necessity of any manual manipulation of movable elements during the tightening operation.

The locking action which results is substantially independent of the relative thickness of the strap member to the dimensions of the openings or the thicknesses of the plates. A wide variety of sizes of straps may be utilized for one size buckle, and swelling of the strap due to the action of water or oil thereon or thinning due to wear or stretching has little or no effect upon the locking action obtained.

The free end of the strap D, after passing through the openings 15, 31 and being locked therein as described, is doubled back upon itself to form an intermediate reverse bend or loop 49 and passes through a second opening 41 adjacent the rectangular opening 15 but offset therefrom and facing angularly thereto, preferably with side walls parallel to the sides of the plates 4. As shown, the plane of the loop 40 is angularly disposed to the sides of the plate and the strap D is angularly disposed in the openings 15, 31, and 41, which angular disposition will be maintained due to the resilience of the strap regardless of whether or not tension is imposed on the strap D.

In the embodiment shown, the opening 41 is formed by a pair of spaced ears 42, 42' formed integrally with the base 4, extending a short distance outwardly from the side of the plate and then extending toward and terminating adjacent each other. The opening may, of course, be formed by other means. The one shown has been found satisfactory and economical from a manufacturing standpoint and is preferred.

The height and width of the opening 41 is preferably somewhat greater than the width and thickness of the strap D and of such a length that the strap, as it passes therethrough, will be given a slight reverse flexing 44 to that of the reversely bent loop 40.

The resilience of the strap member D tends to open outwardly or to enlarge the size of the loop 40. This action maintains the strap canted in the openings 15, 31, 41, and presses one side of the strap in engagement with the sharp edge 19 as well as in engagement with an edge 45 of the opening 41. The resultant pressure on the edge 19 provides a frictional locking action on the strap, tending to lock it from movement in the openings regardless of the action of the locking member 22. The pressure on the edge 19 is increased by the slight reverse flexure 44 imparted to the strap in passing through the opening 41 and engaging the diagonally opposite edge 46 from the edge 45.

The amount of pressure of the strap on the edge 19 depends to a large extent on the resilience of the strap and the amount of flexure which has been imparted thereto in drawing the strap through the opening 41. It has been found that if the strap is pulled hard enough, the limit of flexure of the strap is reached and it is literally jammed onto the edge 19 providing a very secure binding action even without the locking action of the locking member 22.

Thus, regardless of the tension on the strap and the operation of the locking member, a binding action exists at all times between the buckle and the strap sufficient to prevent slippage of the strap from the buckle under the action of tensions which are possibly not of sufficient value or from the proper direction to satisfactorily operate the locking member 22. In addition, the locking member is always held in a position to function immediately upon the application of the slightest tension to the strap.

The emergency antiskid chain of the present invention is easily installed or removed from the wheel of an automotive vehicle. To install the chain, the antiskid elements A are positioned on the upper side of the tread of the tire 1 with the strap D depending behind the tire and the buckle C depending on the outside with the locking plate 22 adjacent the tire or on the inside. The free end 12 of the strap member D is then brought through an opening in the wheel, passed upwardly through the transverse slots 31 and 15 respectively, and pulled up tight, imposing an initial tension on the strap, operating the locking member 22 as described, and holding the chain in position. Both hands may be utilized for pulling the strap tight. It is unnecessary that one hand be removed from the strap to operate the locking member 22. The locking action is automatic. The free end 12 of the strap member then extending out of the opening 15 is doubled back on itself, forming the reversely bent loop 40, inserted through the opening 41, and again pulled up tight. It will be seen that the installation can be accomplished without the manual manipulation of any mechanical member on the buckle and that the buckle readily adapts itself to any size strap, whether oversized or undersized, either initially or due to swelling or wear. In use, should the tensions on the strap increase, the locking or pinching action of the locking member 22 increases proportionately and effectively prevents slippage of the strap member in the buckle.

The emergency antiskid chain is easily removed. The free end of the strap member is backed through the opening 41 until free, opening the reverse bend and removing the pressures on the edge 19. The strap is then backed out of the aligned slots 15 and 31 and the device removed from the tire. It may happen that when it is desired to remove the emergency antiskid chain there will still be sufficient tension on the strap member to cause the locking member to function. In this event a slightly upward and outward pull on the buckle will sufficiently alter the angle that the strap makes with the plate of the buckle to break this locking action.

Thus it will be seen that I have provided a new and improved buckle for an emergency tire chain, adapted to be used on vehicle wheels, the buckle being extremely simple and economical to manufacture, easily installed or removed, unaffected by variations in the strap thickness, and capable of providing a very secure degree of locking action under even the most extreme variations of tension.

While I have shown and described my invention in connection with a preferred embodiment thereof, it should be appreciated that various modifications and alternations will occur to those skilled in the art, and it is my intention to cover all such modifications as set forth in the appended claims.

Having thus described my invention, I claim:

1. In a buckle adapted to removably secure a resilient strap of emergency tire chains or the like, a base member having an elongated strap-receiving slot with its side walls forming squared edges with the faces of the base member, a locking member slidably supported upon one face of the base member and having an elongated strap-receiving slot with its side walls forming squared edges with the faces of the locking member, the second-mentioned slot being shiftable to and from alignment with the first-mentioned slot upon sliding movement of the locking member relative to the base member, the said slots being adapted to have a strap inserted therethrough and disposed with portions thereof extending in opposite directions from said slots adjacent to and substantially parallel with opposite faces of said base and locking members thereby causing the said locking member to slide slightly relative to the base member so that the strap is firmly secured by engagement of the latter with the adjacent edges of said slots, and means one one of said members extending outwardly with respect to the outer face of said base member and forming a strap-receiving opening extending substantially parallel with the outer face of said base member, the said means being positioned relatively closely adjacent that side wall of the first-mentioned slot toward which the said locking member slides when the said strap is disposed as aforementioned so that the free end of said strap is insertable into the said opening by bending the said free end back upon itself, whereupon the resiliency of said strap causes the latter to be still more firmly engaged with the adjacent edges of said slots and tension applied to the free end of said strap further increases the said engagement.

2. In a buckle structure for use on emergency tire chains, a base plate having an elongated strap-receiving slot with its side walls forming squared edges with the faces of the plate, a locking member slidably supported upon one face of said plate and having an elongated strap-receiving slot with its side walls forming squared edges with the faces of the member, the second-mentioned slot being shiftable to and from alignment with the first-mentioned slot upon sliding movement of the locking member relative to the base plate, the said slots being adapted to have a strap inserted therethrough and disposed with portions thereof extending in opposite directions from said slots adjacent to and substantially parallel with opposite faces of said base plate and locking member thereby causing the said locking member to slide slightly relative to the base plate so that the strap is firmly secured by engagement of the latter with the adjacent edges of said slots, and means on said base plate extending outwardly from the outer face thereof and forming a strap-receiving opening extending substantially parallel with the outer face of said base plate, the said means being positioned relatively closely adjacent that side wall of said first-mentioned slot toward which the said locking member slides when the said strap is disposed as aforementioned so that the free end of said strap is insertable into the said opening by bending the said free end back upon itself, whereupon the resiliency of said strap causes the latter to be still more firmly engaged with the adjacent edges of said slots and tension applied to the free end of said strap further increases the said engagement.

3. In a buckle adapted to removably secure a resilient strap of emergency tire chains or the like, a base member having an elongated strap-receiving slot with its side walls forming squared edges with the faces of the base member, a locking member slidably supported upon one face of the base member and having an elongated strap-receiving slot with its side walls forming squared edges with the faces of the locking member, the second-mentioned slot being shiftable to and from alignment with the first-mentioned slot upon sliding movement of the locking member relative to the base member, the said slots being adapted to have a strap inserted therethrough and disposed with portions thereof extending in opposite directions from said slots adjacent to and substantially parallel with opposite faces of said base and locking members thereby causing the said locking member to slide slightly relative to the base member so that the strap is firmly secured by engagement of the latter with the adjacent edges of said slots, and means on one of said members extending outwardly with respect to the outer face of said base member and forming a strap-receiving opening extending substantially parallel with the outer face of said base member, the said means comprising a pair of spaced ears formed integrally from one of said members with portions of said ears extending toward each other and adjacent to but spaced from said outer face of the base member relatively closely adjacent that side wall of said first-mentioned slot toward which the said locking member slides when the said strap is disposed as aforementioned so that the free end of said strap is insertable into the said opening by bending the said free end back upon itself, whereupon the resiliency of said strap causes the latter to be still more firmly engaged with the adjacent edges of said slots and tension applied to the free end of said strap further increases the said engagement.

4. In a buckle structure for use on emergency tire chains, a base plate having an elongated strap-receiving slot with its side walls forming squared edges with the faces of the plate, a locking member slidably supported upon one face of said plate and having an elongated strap-receiving slot with its side walls forming squared edges with the faces of the member, the second-mentioned slot being shiftable to and from alignment with the first-mentioned slot upon sliding movement of the locking member relative to the base plate, the said slots being adapted to have a strap inserted therethrough and disposed with portions thereof extending in opposite directions from said slots adjacent to and substantially parallel with opposite faces of said base plate and locking member thereby causing the said locking member to slide slightly relative to the base plate so that the strap is firmly secured by engagement of the latter with the adjacent edges of said slots, and means on said base plate extending outwardly from the outer face thereof and forming a strap-receiving opening extending substantially parallel with the outer face of said base plate, the said means comprising a pair of spaced ears formed integrally from said base plate with portions of said ears extending towards each other and adjacent to but spaced from said outer face of the said plate relatively closely adjacent that side wall of said first-mentioned slot toward which the said locking member slides when the said strap is disposed as aforementioned so that the free end of said strap is insertable into said opening by bending the said free end back upon itself whereupon the resiliency of said strap causes the latter to be still more firmly engaged with the adjacent edges of said slots and tension applied to the free end of said strap further increases the said engagement.

5. In a buckle member for emergency tire chains having a relatively thick resilient strap member, a base plate having a transverse slot with its side walls forming squared edges with the faces of the plate, a locking member slidably supported upon one of the faces of the base plate and having a transverse slot with its side walls forming squared edges with the faces of the member, the second-mentioned slot being shiftable to and from alignment with the first-mentioned slot upon movement of the locking member relative to the base plate, the widths of said slots being so dimensioned relative to the thickness of the strap and the thicknesses of said member and plate that when a strap member is inserted therethrough and the locking member slid slightly relative to the base plate portions of said strap on either side of said slots extend in opposite directions therefrom substantially parallel to said plate, and said locking member while a portion of said strap within said slots is canted to an angle of approximately 45° thereby causing the strap to be firmly secured by engagement of the latter with the adjacent edges of said slots, said base plate having portions extending outwardly from its outer face adjacent said first-mentioned slot and forming a strap-receiving opening with a substantial dimension extending parallel to the said outer face of said base plate, the said strap-receiving opening being provided relatively closely adjacent that side wall of said first-mentioned slot toward which the said locking member slides when the said strap is disposed as aforementioned so that the free end of said strap is insertable in said opening by disposing the strap in a reverse bend intermediate said slots and said opening whereupon the resiliency of said strap causes the latter to be still more firmly engaged with the adjacent edges of said slots and tension applied to the free end of said strap further increases the said engagement.

FREDERICK G. HODELL.

REFERENCES CITED

The following references are of record in the file of this patent:

UNITED STATES PATENTS

| Number | Name | Date |
| --- | --- | --- |
| 987,576 | Kerngood | Mar. 21, 1911 |
| 1,326,158 | Johnson | Dec. 23, 1919 |
| 2,080,636 | Stahl | May 18, 1937 |
| 2,251,424 | Sailler | Aug. 5, 1941 |

FOREIGN PATENTS

| Number | Country | Date |
| --- | --- | --- |
| 601,218 | France | Nov. 26, 1925 |
| 704,864 | France | Feb. 24, 1931 |